United States Patent
Wu (10) Patent No.: US 9,912,878 B2
(45) Date of Patent: Mar. 6, 2018

(54) FLICKER DETECTION APPARATUS AND METHOD AND NON-TRANSITORY COMPUTER READABLE STORAGE STORING THE FLICKER DETECTION METHOD

(71) Applicant: FUJITSU LIMITED, Kawasaki (JP)

(72) Inventor: Jianrong Wu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/291,578

(22) Filed: Oct. 12, 2016

(65) Prior Publication Data

US 2017/0104914 A1 Apr. 13, 2017

(30) Foreign Application Priority Data

Oct. 13, 2015 (CN) .......................... 2015 1 0670626

(51) Int. Cl.
*H04N 5/235* (2006.01)

(52) U.S. Cl.
CPC ................................ *H04N 5/2357* (2013.01)

(58) Field of Classification Search
CPC ..................................................... H04N 5/2357
See application file for complete search history.

(56) References Cited

U.S. PATENT DOCUMENTS

| | | | |
|---|---|---|---|
| 2006/0147090 A1 | 7/2006 | Yang | |
| 2012/0154628 A1* | 6/2012 | Horiuchi | H04N 5/2353 348/226.1 |
| 2012/0154629 A1* | 6/2012 | Horiuchi | H04N 7/0127 348/226.1 |
| 2015/0022686 A1 | 1/2015 | Wu et al. | |
| 2015/0029360 A1* | 1/2015 | Wu | H04N 5/2357 348/226.1 |
| 2015/0281546 A1* | 10/2015 | Okada | H04N 5/2357 348/226.1 |

FOREIGN PATENT DOCUMENTS

| | | |
|---|---|---|
| CN | 101567977 A | 10/2009 |
| CN | 104104882 A | 10/2014 |
| CN | 104301617 A | 1/2015 |
| CN | 104301618 A | 1/2015 |
| CN | 104378628 A | 2/2015 |

OTHER PUBLICATIONS

Chinese Office Action dated Nov. 23, 2017 in corresponding Chinese Patent Application No. 201510670626.8.
Chinese Search Report dated Nov. 6, 2017 in corresponding Chinese Patent Application No. 201510670626.8.

* cited by examiner

*Primary Examiner* — Tuan Ho
(74) *Attorney, Agent, or Firm* — Staas & Halsey LLP (57) ABSTRACT

A flicker detection apparatus and method where flickers in the video images are detected based on the mean detection values obtained from pairs of neighboring frames in the current frame and the former n frames, which is able to perform flicker detection efficiently, and the detection results are accurate.

18 Claims, 6 Drawing Sheets

FLICKER DETECTION APPARATUS AND METHOD AND NON-TRANSITORY COMPUTER READABLE STORAGE STORING THE FLICKER DETECTION METHOD

CROSS-REFERENCE TO RELATED APPLICATIONS

This application claims the priority benefit of Chinese Patent Application No. 201510670626.8, filed on Oct. 13, 2015 in the Chinese Intellectual Property Office, the disclosure of which is incorporated herein in its entirety by reference.

BACKGROUND

1. Field

The present disclosure relates to the field of information technologies, and in particular to a flicker detection apparatus and method.

2. Description of the Related Art

In recent years, CMOS (complementary metal oxide semiconductor) image sensor has been used in image capture devices broadly, such as a digital camera, a digital video camera, and a smart mobile phone, etc. Because the timing of photoelectric conversion is different for each pixel or each row of pixels in the process of photoelectric conversion, bright-dark horizontal stripes exist in captured images, when image capture is performed under fluorescent lamp illumination or under some other illumination conditions where the brightness changes periodically. And such horizontal stripes generated by periodical changes of the illumination light in captured images are called "flickers".

To suppress such flickers, the exposure time should be set according to the flicker frequency. So the detection of whether flickers exist in an image and a flicker frequency is a significant issue.

In existing flicker detection methods, some use a light detector to detect light signals, and detect flickers by using calculation results of square waves with different frequencies and detected light signals. And some divide the columns of a frame image into several portions, calculate the average values of each column portion in each row, and use square waves with different frequencies for calculating average value vectors for each column portion, to detect the flickers by comparing calculation results.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Additional aspects and/or advantages will be set forth in part in the description which follows and, in part, will be apparent from the description, or may be learned by practice of the embodiments.

When the above existing methods are used to detect flickers, efficiency and accuracy of the detection are relatively low.

Embodiments of the present disclosure provide a flicker detection apparatus and method, in which flickers are detected based on the mean detection values obtained from pairs of neighboring frames in the current frame and the former n frames, which is able to perform flicker detection efficiently, and the detection results are accurate.

According to a first aspect of embodiments of the present disclosure, there is provided a flicker detection apparatus, including: a first calculating unit configured to calculate respectively differential vectors of row vectors of neighboring frames in a current frame and former n frames of video images according to mean value row vectors of the current frame and the former n frames of the video images, n being an integer greater than or equal to 1; a second calculating unit configured to calculate a mean value of a sum of absolute values of dot products of the differential vectors of the row vectors of the neighboring frames in the current frame and the former n frames of the video images and all square waves of a first group of square waves having a first frequency, and take the mean value as a first mean detection value of the current frame; a third calculating unit configured to calculate a mean value of a sum of absolute values of dot products of the differential vectors of the row vectors of the neighboring frames in the current frame and the former n frames of the video images and all square waves of a second group of square waves having a second frequency, and take the mean value as a second mean detection value of the current frame; and a first flicker detecting unit configured to detect flickers of the current frame of the video images according to a maximum value of the first mean detection value and the second mean detection value and a sum of the first mean detection value and the second mean detection value.

According to a second aspect of embodiments of the present disclosure, there is provided a flicker detection method, including: calculating respectively differential vectors of row vectors of neighboring frames in a current frame and former n frames of video images according to mean value row vectors of the current frame and the former n frames of the video images, n being an integer greater than or equal to 1; calculating a mean value of a sum of absolute values of dot products of the differential vectors of the row vectors of the neighboring frames in the current frame and the former n frames of the video images and all square waves of a first group of square waves having a first frequency, and taking the mean value as a first mean detection value of the current frame; calculating a mean value of a sum of absolute values of dot products of the differential vectors of the row vectors of the neighboring frames in the current frame and the former n frames of the video images and all square waves of a second group of square waves having a second frequency, and taking the mean value as a second mean detection value of the current frame; and detecting flickers of the current frame of the video images according to a maximum value of the first mean detection value and the second mean detection value and a sum of the first mean detection value and the second mean detection value.

An advantage of embodiments of the present disclosure exists in that the flickers in the video images are detected based on the mean detection values obtained from pairs of neighboring frames in the current frame and the former n frames, which is able to perform flicker detection efficiently, and the detection results are accurate.

With reference to the following description and drawings, the particular embodiments of the present disclosure are disclosed in detail, and the principles of the present disclosure and the manners of use are indicated. It should be understood that the scope of embodiments of the present disclosure is not limited thereto. Embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the exemplary embodiments of the present disclosure, and are used for setting forth the principles of the present disclosure together with the description. It is clear and understood that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

Reference will now be made in detail to the embodiments, examples of which are illustrated in the accompanying drawings, wherein like reference numerals refer to the like elements throughout. The embodiments are described below by referring to the figures.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of the present disclosure shall be described below with reference to the accompanying drawings.

Embodiment 1

Figure 1:
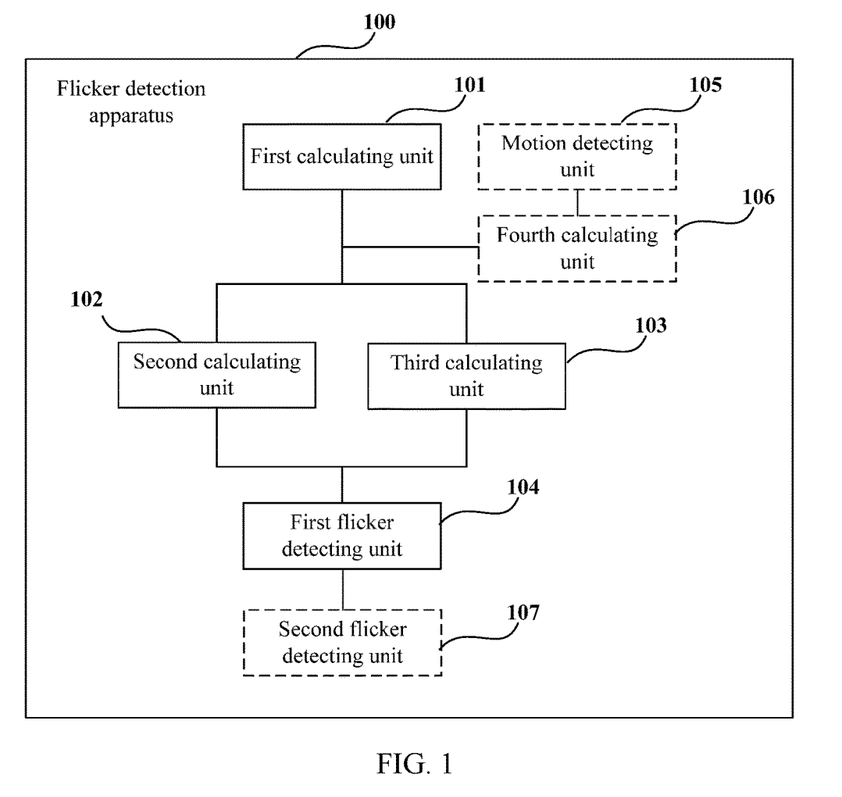
FIG. 1 is a schematic diagram of a structure of the flicker detection apparatus of Embodiment 1 of the present disclosure.

FIG. 1 is a schematic diagram of a structure of the flicker detection apparatus of Embodiment 1 of the present disclosure. As shown in FIG. 1, the apparatus 100, which may be a computer and a memory storing a program, includes:

a first calculating unit 101 configured to calculate respectively differential vectors of row vectors of neighboring frames in a current frame and former n frames of video images according to mean value row vectors of the current frame and the former n frames of the video images, n being an integer greater than or equal to 1;

a second calculating unit 102 configured to calculate a mean value of a sum of absolute values of dot products of the differential vectors of the row vectors of the neighboring frames in the current frame and the former n frames of the video images and all square waves of a first group of square waves having a first frequency, and take the mean value as a first mean detection value of the current frame;

a third calculating unit 103 configured to calculate a mean value of a sum of absolute values of dot products of the differential vectors of the row vectors of the neighboring frames in the current frame and the former n frames of the video images and all square waves of a second group of square waves having a second frequency, and take the mean value as a second mean detection value of the current frame; and a first flicker detecting unit 104 configured to detect flickers of the current frame of the video images according to a maximum value of the first mean detection value and the second mean detection value and a sum of the first mean detection value and the second mean detection value.

It can be seen from the above embodiment that the flickers are detected based on the mean detection values obtained from pairs of neighboring frames in the current frame and the former n frames, which is able to perform flicker detection efficiently, and the detection results are accurate.

In this embodiment, the video images may be obtained by using an existing method, such as being obtained by shooting by electronic equipment, such as a digital camera, and a digital video camera, etc.

In this embodiment, the former n frames of the video images refer to n frames preceding the current frame, total n frames of image. Then, the current frame and the former n frames include totally n+1 frames of image; where, n is an integer greater than or equal to 1, such as an integer from 2 to 4.

In this embodiment, the mean value row vectors of the current frame and the former n frames of the video images may be obtained by using an existing method. A method for calculating mean value row vectors of this embodiment shall be illustrated below.

In this embodiment, when the video images are color images, the color images need to be converted into gray scale images. After the color images are converted into the gray scale images, for each frame of gray scale images, all the rows may be selected for calculating its mean value row vectors, and sampling rows obtained by uniform sampling of the image may also be selected for calculation. In this embodiment, description shall be given taking that sampling rows are selected for calculating the mean value row vectors as an example.

In this embodiment, it is assumed that a height of each frame of image is height, a width is width, and then each frame of image has pixels of height rows and width columns.

In this embodiment, the mean value row vectors may be calculated according to formulae (1) and (2) below:

$$\text{mean\_row}(k,i)=\text{mean}(\text{frame}(k,i\text{Row},:)) \quad (1),$$

$$i\text{Row}=(i-1)\times\text{floor}(\text{height}/256)+1 \quad (2);$$

where, mean_row(k,i) denotes a mean value row vector of an i-th row of sampling rows of a k-th frame, mean( ) denotes a function of taking a mean, the symbol ":" denotes all columns, iRow denotes a row vector of an i-th row of the frame of image, floor(height/256) denotes a sampling interval, the function floor ( ) denotes taking an integer, and height denotes a height of the frame of image, k and i being positive integers.

In this embodiment, when the current frame of the video images is, for example, the k-th frame, a former frame of the current frame is (k−1)-th frame, and so on.

In this embodiment, after obtaining the mean value row vectors of each of the current frame and the former n frames, the first calculating unit 101 calculates respectively the differential vectors of the row vectors of the neighboring frames in the current frame and the former n frames of the video images according to the mean value row vectors of the current frame and the former n frames.

In this embodiment, an existing method may be used for calculating the differential vectors of the row vectors. For example, the differential vectors of the row vectors of the neighboring frames may be calculated according to formulae (3) and (4) below:

$$\text{diff\_frame}(k)=\text{mean\_row}(k)-\text{mean\_row}(k-1) \quad (3),$$

$$\text{diff\_mean\_row}(k)=\text{diff\_frame}(k)-\text{mean}(\text{diff\_frame}(k)) \quad (4);$$

where, diff_mean_row(k) denotes the differential vector of the row vectors of the k-th frame and the (k−1)-th frame, mean_row(k) denotes the mean value row vector of the k-th frame, mean_row(k−1) denotes the mean value row vector of the (k−1)-th frame, and mean( ) denotes a function of taking a mean, k being a positive integer.

In this embodiment, the second calculating unit 102 and the third calculating unit 103 respectively use the first group of square waves having a first frequency and the second group of square waves having a second frequency to calculate the first mean detection value and the second mean detection value.

In this embodiment, an existing method may be used to construct the square waves. For example, the first frequency of the first group of square waves and the second frequency of the second group of square waves may correspond to the frequencies of the current commercial power. Taking an illumination environment of a fluorescent lamp as an example, a cause of generation of flickers exists in that frequencies exist in the alternating current. The frequency of the worldwide commercial power is usually 50 Hz or 60 Hz, hence, when there exist flickers, a frequency of which may possibly be 100 Hz or 120 Hz.

Figure 2:
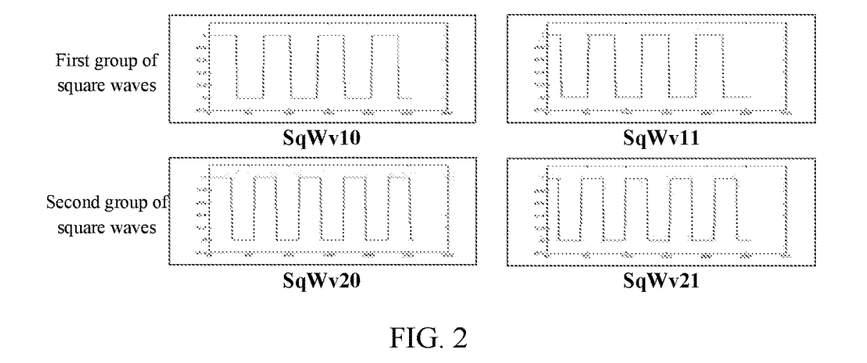
FIG. 2 is a schematic diagram of waveforms of a first group of square waves and a second group of square waves of Embodiment 1 of the present disclosure.

FIG. 2 is a schematic diagram of waveforms of the first group of square waves and the second group of square waves of Embodiment 1 of the present disclosure. As shown in FIG. 2, the first frequency of the first group of square waves is 100 Hz, which has a first square wave SqWv10 and a second square wave SqWv11, a phase difference between the first square wave SqWv10 and the second square wave SqWv11 being 90 degrees; and the second frequency of the second group of square waves is 120 Hz, which has a third square wave SqWv20 and a fourth square wave SqWv21, a phase difference between the third square wave SqWv20 and the fourth square wave SqWv21 being 90 degrees.

In this embodiment, elements per cycle of each square wave in the first group of square waves and the second group of square waves may have the same length as those of the differential vectors of the row vectors of the neighboring frames in the current frame and the former n frames. For example, elements per cycle of the square wave may be calculated according to formula (5) below:

$$\text{CycleElm}=\text{floor}((\text{height}\cdot FPS)/(\text{floor}(\text{height}/256)\cdot \text{frequency})) \quad (5);$$

where, CycleElm denotes the elements per cycle of the square wave, FPS denotes the number of frames per second of the video images, height denotes an image height of each frame, and frequency denotes a frequency of the square wave.

In this embodiment, the second calculating unit 102 calculates the mean value of the sum of the absolute values of the dot products of the differential vectors of the row vectors of the neighboring frames in the current frame and the former n frames and the first square wave SqWv10 and the second square wave SqWv11, and takes the mean value as the first mean detection value of the current frame; and the third calculating unit 103 calculates the mean value of the sum of the absolute values of the dot products of the differential vectors of the row vectors of the neighboring frames in the current frame and the former n frames and the third square wave SqWv20 and the fourth square wave SqWv21, and takes the mean value as the second mean detection value of the current frame.

For example, the second calculating unit 102 and the third calculating unit 103 may calculate the sum of the absolute values of the dot products of the differential vectors of the row vectors of the neighboring frames in the current frame and the former n frames and the first square wave SqWv10 and the second square wave SqWv11 and the sum of the absolute values of the dot products of the differential vectors of the row vectors of the neighboring frames in the current frame and the former n frames and the third square wave SqWv20 and the fourth square wave SqWv21 according to formulae (6) and (7) below:

$$\text{sum\_Sqr\_F1}(k)=|\Sigma\text{diff\_mean\_row}(k)\cdot SqWv10|+|\Sigma\text{diff\_mean\_row}(k)\cdot SqWv11| \quad (6),$$

$$\text{sum\_Sqr\_F2}(k)=|\Sigma\text{diff\_mean\_row}(k)\cdot SqWv20|+|\Sigma\text{diff\_mean\_row}(k)\cdot SqWv21| \quad (7);$$

where, sum_Sqr_F1(k) denotes the sum of the absolute values of the dot products of the differential vector of the row vectors of the k-th frame and the (k−1)-th frame and the first square wave SqWv10 and the second square wave SqWv11, sum_Sqr_F2(k) denotes the sum of the absolute values of the dot products of the differential vector of the row vectors of the k-th frame and the (k−1)-th frame and the third square wave SqWv20 and the fourth square wave SqWv21, and diff_mean_row (k) denotes the differential vector of the row vectors of the k-th frame and the (k−1)-th frame.

And the second calculating unit 102 and the third calculating unit 103 may, according to formulae (8) and (9) below, calculate the mean value of the sum of the absolute values calculated by using formulae (6) and (7), i.e. the first mean detection value and the second mean detection value:

$$\text{ave\_Sqr\_F1}(k) = \sum_{i=k-n+1}^{k} \text{sum\_Sqr\_F1}(i)/n, \quad (8)$$

$$\text{ave\_Sqr\_F2}(k) = \sum_{i=k-n+1}^{k} \text{sum\_Sqr\_F2}(i)/n; \quad (9)$$

where, ave_Sqr_F1(k) denotes the first mean detection value of the k-th frame, ave_Sqr_F2(k) denotes the second mean detection value of the k-th frame, n denotes the number of used frames preceding the current frame, n being a positive integer, sum_Sqr_F1(i) denotes the sum of the absolute values of the dot products of the differential vector of the row vectors of an i-th frame and an (i−1)-th frame and the first square wave SqWv10 and the second square wave SqWv11, and sum_Sqr_F2(i) denotes the sum of the absolute values of the dot products of the differential vector of the row vectors of the i-th frame and the (i−1)-th frame and the third square wave SqWv20 and the fourth square wave SqWv21, k−n+1≤i≤k, and k and i being positive integers.

In this embodiment, after the first mean detection value and the second mean detection value are calculated, the first flicker detecting unit 104 detects the flickers of the current frame of the video images according to the maximum value of the first mean detection value and the second mean detection value and the sum of the first mean detection value and the second mean detection value. A structure of the first flicker detecting unit 104 and a method for detecting the flickers of the current frame shall be illustrated below.

Figure 3:
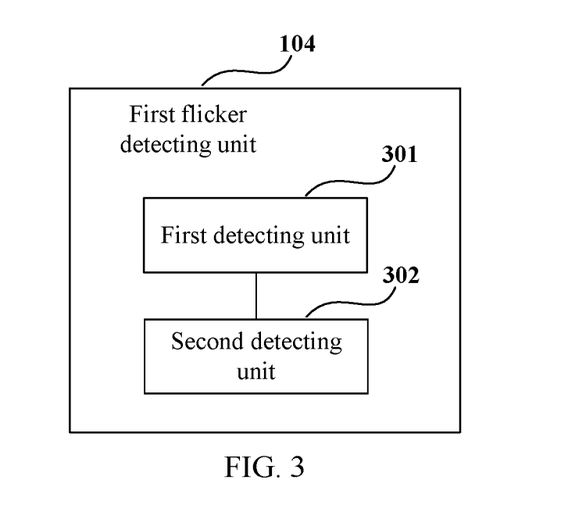
FIG. 3 is a schematic diagram of a structure of a first flicker detecting unit 104 of Embodiment 1 of the present disclosure.

FIG. 3 is a schematic diagram of a structure of the first flicker detecting unit 104 of Embodiment 1 of the present disclosure. As shown in FIG. 3, the first flicker detecting unit 104 includes:

a first detecting unit 301 configured to determine that there exist flickers in the current frame of the video images when a predefined condition is satisfied that the maximum value of the first mean detection value and the second mean detection value is greater than a first threshold value and the sum of the first mean detection value and the second mean detection value is greater than a second threshold value; and a second detecting unit 302 configured to determine that there exists no flicker in the current frame of the video images when the predefined condition is not satisfied.

In this embodiment, the first threshold value and the second threshold value may be set according to an actual situation, and their numeral values are not limited in this embodiment.

Figure 4:
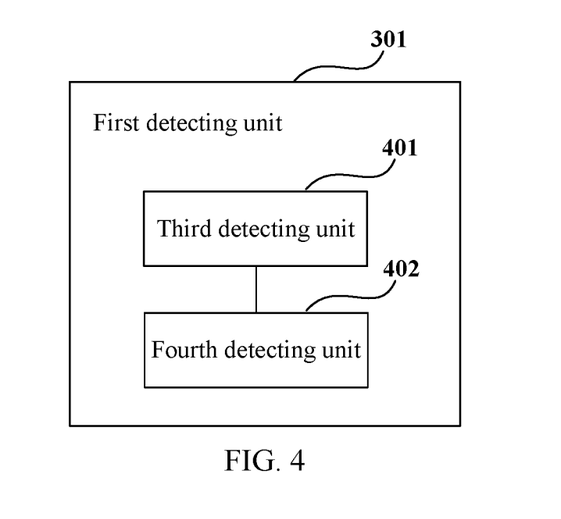
FIG. 4 is a schematic diagram of a structure of a first detecting unit 301 of Embodiment 1 of the present disclosure.

FIG. 4 is a schematic diagram of a structure of the first detecting unit 301 of Embodiment 1 of the present disclosure. As shown in FIG. 4, the first detecting unit 301 includes:

a third detecting unit 401 configured to determine that a frequency of the flickers in the current frame of the video images is the first frequency when the maximum value of the first mean detection value and the second mean detection value is greater than the first threshold value, the sum of the first mean detection value and the second mean detection value is greater than the second threshold value and the first mean detection value is greater than the second mean detection value; and a fourth detecting unit 402 configured to determine that a frequency of the flickers in the current frame of the video images is the second frequency when the maximum value of the first mean detection value and the second mean detection value is greater than the first threshold value, the sum of the first mean detection value and the second mean detection value is greater than the second threshold value and the first mean detection value is less than the second mean detection value.

For example, the first flicker detecting unit 104 may detect the flickers of the current frame (the k-th frame) according to formula (10) below:

$$FLFD(k) = \begin{cases} Fre1, & \text{max\_Sqr}(k) > ThreMAX \,\&\&\, \text{sum\_Sqr}(k) > ThreSUM \,\&\&\, \text{ave\_Sqr\_F1}(k) > \text{ave\_Sqr\_F2}(k) \\ Fre2, & \text{max\_Sqr}(k) > ThreMAX \,\&\&\, \text{sum\_Sqr}(k) > ThreSUM \,\&\&\, \text{ave\_Sqr\_F1}(k) < \text{ave\_Sqr\_F2}(k); \\ none, & \text{else} \end{cases} \quad (10)$$

where, FLFD(k) denotes a flicker frequency of the k-th frame, max_Sqr(k) denotes the maximum value of the first mean detection value and the second mean detection value of the k-th frame, sum_Sqr(k) denotes the sum of the first mean detection value and the second mean detection value, ThreMAX denotes the first threshold value, ThreSUM denotes the second threshold value, and none denotes no flicker.

In this embodiment, the first threshold value ThreMAX and the second threshold value ThreSUM may be set according to an actual situation. For example, the first threshold value ThreMAX is 7, and the second threshold value ThreSUM is 2. And particular numeral values of the threshold values are not limited in this embodiment.

In this embodiment, the apparatus 100 may further include:

a motion detecting unit 105 configured to detect a motion state of the current frame of the video images; and a fourth calculating unit 106 configured to, when the current frame of the video images is in a motion state, remove part of pixels of mean value row vectors of each frame of the current frame and the former n frames of the video images, and recalculate the differential vectors of the row vectors of the neighboring frames in the current frame and the former n frames of the video images for calculating the first mean detection value and the second mean detection value.

In this embodiment, the motion detecting unit 105 and the fourth calculating unit 106 are optional, and are shown by dashed boxes in FIG. 1.

Hence, by recalculating the differential vectors of the row vectors of the neighboring frames based on the motion state, detection may still be accurately performed in a case where a camera device is shaken, thereby improving motion tolerance.

In this embodiment, the motion detecting unit 105 may use an existing method to detect the motion state of the current frame (the k-th frame). For example, the motion state of the current frame may be detected according to formulae (11) and (12) below:

$$\text{mean\_diff\_mean\_row}(k) = \text{mean}(\text{abs}(\text{diff\_mean\_row}(k))), \quad (11)$$

$$\text{motion\_frame}(k) = \begin{cases} 1, & \text{mean\_diff\_mean\_row}(k) > \text{Thre\_mdf} \\ 0, & \text{else} \end{cases}; \quad (12)$$

where, motion_frame(k) denotes the motion state of the k-th frame, 1 denotes that there exists a motion, 0 denotes that there exists no motion, Thre_mdf denotes a predetermined threshold, such as Thre_mdf=1, diff_mean_row(k) denotes the differential vector of the row vectors of the k-th frame and the (k−1)-th frame, mean( )denotes a function of taking a mean, and abs( ) denotes a function of taking an absolute value.

In a case where the current frame of the video images is in a motion state, the fourth calculating unit 106 removes the part of pixels of mean value row vectors of each frame of the current frame and the former n frames of the video images, and recalculates the differential vectors of the row vectors of the neighboring frames in the current frame and the former n frames of the video images for calculating the first mean detection value and the second mean detection value.

Figure 5:
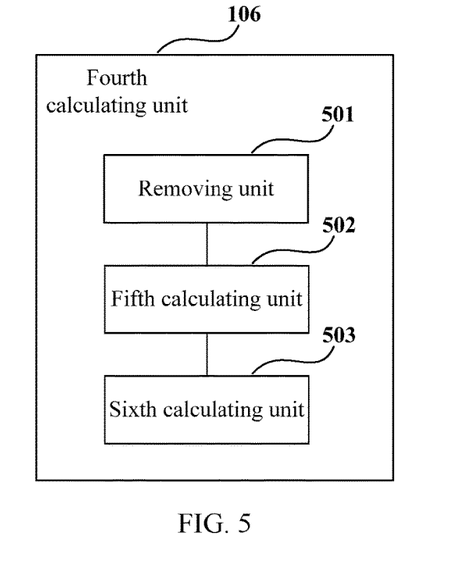
FIG. 5 is a schematic diagram of a structure of a fourth calculating unit 106 of Embodiment 1 of the present disclosure.

FIG. 5 is a schematic diagram of a structure of the fourth calculating unit 106 of Embodiment 1 of the present disclosure. As shown in FIG. 5, the fourth calculating unit 106 includes:

a removing unit 501 configured to remove the part of pixels of the mean value row vectors of each frame of the current frame and the former n frames of the video images;

a fifth calculating unit 502 configured to calculate match rates between the mean value row vector of a latter frame in the neighboring frames with part of pixels being removed and the mean value row vectors of a former frame in the neighboring frames with part of pixels being removed of the same length as the mean value row vector of the latter frame with part of pixels being removed; and a sixth calculating unit 503 configured to calculate the differential vectors of the row vectors of the neighboring frames in the current frame and the former n frames of the video images according to the mean value row vector of the latter frame in the neighboring frames with part of pixels being removed and the mean value row vector of the former frame with part of pixels being removed having a highest match rate.

Figure 6:
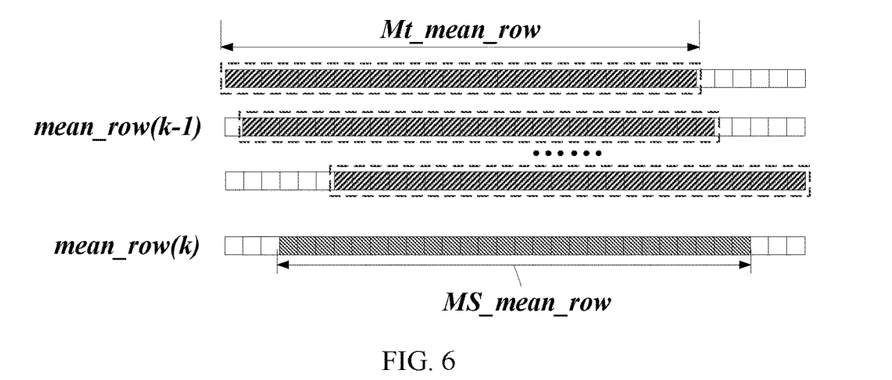
FIG. 6 is a schematic diagram of mean value row vectors of a k-th frame and a (k-1)-th frame with part of pixels being removed of Embodiment 1 of the present disclosure.

Following description is given taking recalculating the differential vector diff_mean_row(k) of the row vectors of the k-th frame and the (k−1)-th frame as an example.

FIG. 6 is a schematic diagram of the mean value row vectors of the k-th frame and the (k−1)-th frame with part of pixels being removed of Embodiment 1 of the present disclosure. As shown in FIG. 6, for the mean value row vector mean_row(k) of the k-th frame, part of pixels at front and end portions are removed at a predetermined proportion, and a length of the mean value row vector with the part of the pixels being removed is MS_mean_row; and for the mean value row vector mean_row (k−1) of the (k−1)-th frame, there exist multiple candidate mean value row vectors whose length Mt_mean_row with the part of the pixels being removed is equal to MS_mean_row.

In this embodiment, the fifth calculating unit 502 calculates the match rates between these candidate mean value row vectors with MS_mean_row. For example, the match rates may be calculated according to formula (13) below:

$$\text{matchingRate} = \text{sum}(\text{abs}(MS\_\text{mean\_row} - Mt\_\text{mean\_row})) \quad (13);$$

where, matchingRate denotes the match rate, MS_mean_row denotes the mean value row vector of the k-th frame with part of the pixels being removed, Mt_mean_row denotes the mean value row vectors of the (k−1)-th frame with part of the pixels being removed, abs( )denotes a function of taking an absolute value, and sum( )denotes a function of taking a sum.

After the match rates of all the candidate mean value row vectors of the (k−1)-th frame are calculated, a candidate mean value row vector having a highest match rate is determined as MM_mean_row, and the sixth calculating unit 503 recalculates the differential vector diff_mean_row (k) of the row vectors of the k-th frame and the (k−1)-th frame according to the determined MM_mean_row and MS_mean_row. For example, diff_mean_row (k) may be recalculated according to formulae (14) and (15) below:

$$\text{diff\_frame\_}MM(k) = MS\_\text{mean\_row} - MM\_\text{mean\_row} \quad (14),$$

$$\text{diff\_mean\_row}(k) = \text{diff\_frame\_}MM(k) - \text{mean}(\text{diff\_frame\_}MM(k)) \quad (15);$$

where, diff_mean_row(k) denotes the recalculated differential vector of the row vectors of the k-th frame and the (k−1)-th frame, MS_mean_row denotes the mean value row vector of the k-th frame with part of the pixels being removed, and MM_mean_row denotes the mean value row vector of the (k−1)-th frame with part of the pixels being removed having a highest match rate.

In this embodiment, the first calculating unit 101, the second calculating unit 102, the third calculating unit 103 and the first flicker detecting unit 104 may further be configured to detect flickers of former m frames of the current frame of the video images, m being an integer greater than 1, such as an integer from 10-20. In this embodiment, a method for detecting the flickers of the former m frames is identical to the method for detecting the flickers of the current frame, and shall not be described herein any further.

And the apparatus 100 further includes:

a second flicker detecting unit 107 configured to detect flickers of the video images according to detection result duty ratios of the first frequency and the second frequency in total m+1 frames from the current frame and the former m frames.

In this embodiment, the second flicker detecting unit 107 is optional, and is shown in FIG. 1 by dashed boxes.

Thus, by detecting the flickers of the current frame and the former m frames, total m+1 frames, and detecting the flickers of the video images based on the detection result duty ratios, continuity of the detection result may be improved.

A structure of the second flicker detecting unit 107 and a detection method shall be illustrated below.

Figure 7:
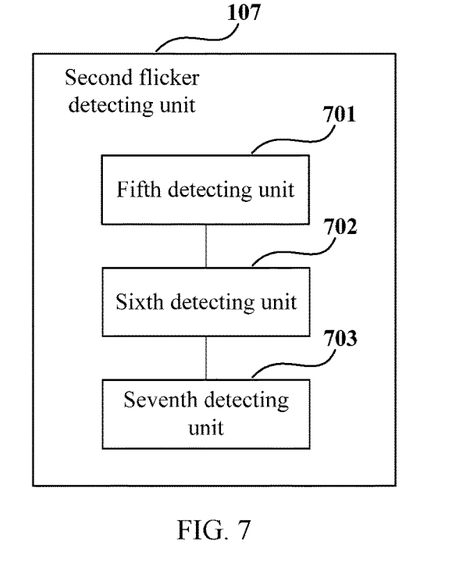
FIG. 7 is a schematic diagram of a structure of a second flicker detecting unit 107 of Embodiment 1 of the present disclosure.

FIG. 7 is a schematic diagram of a structure of the second flicker detecting unit 107 of Embodiment 1 of the present disclosure. As shown in FIG. 7, the second flicker detecting unit 107 includes:

a fifth detecting unit 701 configured to determine that a frequency of the flickers of the video images is the first frequency when the detection result duty ratio of the first frequency in the m+1 frames is greater than a third threshold value;

a sixth detecting unit 702 configured to determine that a frequency of the flickers of the video images is the second frequency when the detection result duty ratio of the first frequency in the m+1 frames is less than or equal to the third threshold value and the detection result duty ratio of the second frequency in the m+1 frames is greater than the third threshold value; and a seventh detecting unit 703 configured to determine that there exists no flicker in the video images when the detection result duty ratio of the first frequency in the m+1 frames is less than or equal to the third threshold value and the detection result duty ratio of the second frequency in the m+1 frames is less than or equal to the third threshold value.

Figure 8:
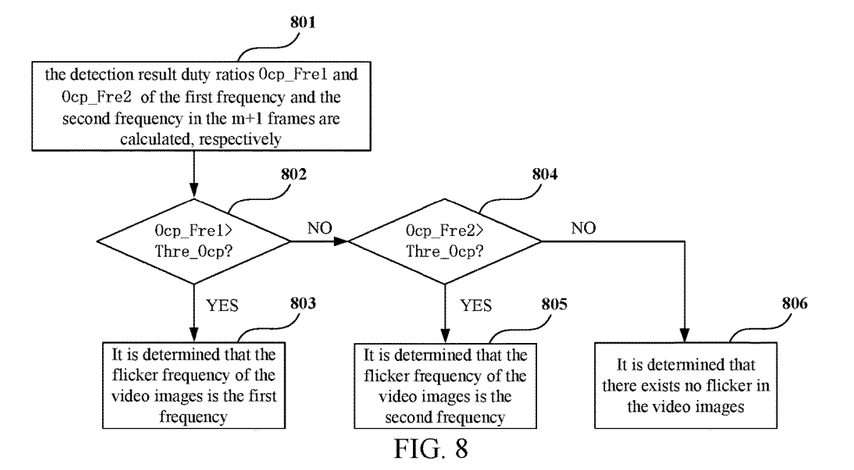
FIG. 8 is a flowchart of the method for detecting flickers of video images of Embodiment 1 of the present disclosure.

FIG. 8 is a flowchart of the method for detecting flickers of video images of Embodiment 1 of the present disclosure. As shown in FIG. 8, the method includes:

Step 801: the detection result duty ratios Ocp_Fre1 and Ocp_Fre2 of the first frequency and the second frequency in the m+1 frames are calculated, respectively;

Step 802: it is judged whether Ocp_Fre1 is greater than the third threshold value Thre_Ocp, entering into step 803 when it is judged "yes", and entering into step 804 when it is judged "no";

Step 803: it is determined that the flicker frequency of the video images is the first frequency;

Step 804: it is judged whether Ocp_Fre2 is greater than the third threshold value Thre_Ocp, entering into step 805 when it is judged "yes", and entering into step 806 when it is judged "no";

Step 805: it is determined that the flicker frequency of the video images is the second frequency;

Step 806: it is determined that there exists no flicker in the video images.

In this embodiment, an existing method may be used for calculating the detection result duty ratios Ocp_Fre1 and Ocp_Fre2 of the first frequency and the second frequency in the m+1 frames. For example, Ocp_Fre1 and Ocp_Fre2 may be calculated according to formulae (16) and (17) below:

$$Ocp\_Fre1 = len\_Fre1/BL \quad (16),$$

$$Ocp\_Fre2 = len\_Fre2/BL \quad (17);$$

where, Ocp_Fre1 and Ocp_Fre2 respectively denote the detection result duty ratios of the first frequency and the second frequency in the m+1 frames, len_Fre1 and len_Fre2 respectively denote the numbers of times that the detection results in the m+1 frames are the first frequency and the second frequency, and BL denotes a total number of frames, i.e. m+1.

In this embodiment, the third threshold value may be set according to an actual situation. For example, the third threshold value is 0.6.

It can be seen from the above embodiment that the flickers are detected based on the mean detection values obtained from pairs of neighboring frames in the current frame and the former n frames, which is able to perform flicker detection efficiently, and the detection results are accurate.

Embodiment 2

Figure 9:
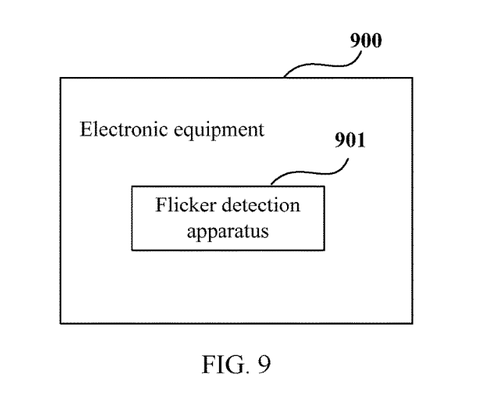
FIG. 9 is a schematic diagram of a structure of electronic equipment of Embodiment 2 of the present disclosure.

An embodiment of the present disclosure further provides electronic equipment. FIG. 9 is a schematic diagram of a structure of the electronic equipment of Embodiment 2 of the present disclosure. As shown in FIG. 9, the electronic equipment 900 includes a flicker detection apparatus 901. In this embodiment, a structure and functions of the flicker detection apparatus 901 are identical to those described in Embodiment 1, and shall not be described herein any further.

In this embodiment, the electronic equipment may be or have equipment having a function of image capturing, such as a digital camera, a digital video camera, and a smart mobile phone, etc.

Figure 10:
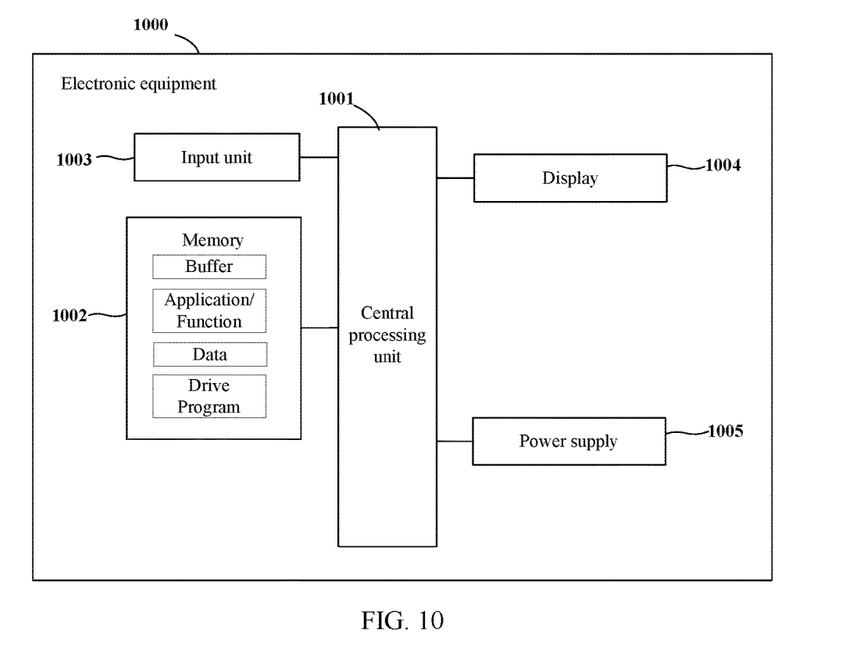
FIG. 10 is a block diagram of a systematic constitution of the electronic equipment of Embodiment 2 of the present disclosure.

FIG. 10 is a block diagram of a systematic constitution of the electronic equipment of Embodiment 2 of the present disclosure. As shown in FIG. 10, the electronic equipment 1000, which may be a computer, may include a central processing unit 1001 and a memory 1002, the memory 1002 being coupled to the central processing unit 1001. It should be noted that this figure is illustrative only, and other types of structures may also be used, so as to supplement or replace this structure and achieve telecommunications function or other functions.

As shown in FIG. 10, the electronic equipment 1000 may further include an input unit 1003, a display 1004 and a power supply 1005.

In an implementation, the functions of the flicker detection apparatus described in Embodiment 1 may be integrated into the central processing unit 1001. For example, the central processing unit 1001 may be configured to: calculate respectively differential vectors of row vectors of neighboring frames in a current frame and former n frames of video images according to mean value row vectors of the current frame and the former n frames of the video images, n being an integer greater than or equal to 1; calculate a mean value of a sum of absolute values of dot products of the differential vectors of the row vectors of the neighboring frames in the current frame and the former n frames of the video images and all square waves of a first group of square waves having a first frequency, and take the mean value as a first mean detection value of the current frame; calculate a mean value of a sum of absolute values of dot products of the differential vectors of the row vectors of the neighboring frames in the current frame and the former n frames of the video images and all square waves of a second group of square waves having a second frequency, and take the mean value as a second mean detection value of the current frame; and detect flickers of the current frame of the video images according to a maximum value of the first mean detection value and the second mean detection value and a sum of the first mean detection value and the second mean detection value.

For example, the detecting flickers of the current frame of the video images according to a maximum value of the first mean detection value and the second mean detection value and a sum of the first mean detection value and the second mean detection value includes: determining that there exist flickers in the current frame of the video images when a predefined condition is satisfied that the maximum value of the first mean detection value and the second mean detection value is greater than a first threshold value and the sum of the first mean detection value and the second mean detection value is greater than a second threshold value, and determining that there exists no flicker in the current frame of the video images when the predefined condition is not satisfied.

For example, the determining that there exist flickers in the current frame of the video images when a predefined condition is satisfied that the maximum value of the first mean detection value and the second mean detection value is greater than a first threshold value and the sum of the first mean detection value and the second mean detection value is greater than a second threshold value includes: determining that a frequency of the flickers in the current frame of the video images is the first frequency when the maximum value of the first mean detection value and the second mean detection value is greater than the first threshold value, the sum of the first mean detection value and the second mean detection value is greater than the second threshold value and the first mean detection value is greater than the second mean detection value, and determining that a frequency of the flickers in the current frame of the video images is the second frequency when the maximum value of the first mean detection value and the second mean detection value is greater than the first threshold value, the sum of the first mean detection value and the second mean detection value is greater than the second threshold value and the first mean detection value is less than the second mean detection value.

For example, n is an integer from 2 to 4.

For example, the central processing unit 1001 may further be configured to: detect a motion state of the current frame of the video images; when the current frame of the video images is in a motion state, remove part of pixels of mean value row vectors of each frame of the current frame and the former n frames of the video images, and recalculate the differential vectors of the row vectors of the neighboring frames in the current frame and the former n frames of the video images for calculating the first mean detection value and the second mean detection value.

For example, the when the current frame of the video images is in a motion state, removing part of pixels of mean value row vectors of each frame of the current frame and the former n frames of the video images, and recalculating the differential vectors of the row vectors of the neighboring frames in the current frame and the former n frames of the video images, includes: removing the part of pixels of the mean value row vectors of each frame of the current frame and the former n frames of the video images; calculating match rates between the mean value row vector of a latter frame in the neighboring frames with part of pixels being removed and the mean value row vectors of a former frame in the neighboring frames with part of pixels being removed of the same length as the mean value row vector of the latter frame with part of pixels being removed; and calculating the differential vectors of the row vectors of the neighboring frames in the current frame and the former n frames of the video images according to the mean value row vector of the latter frame in the neighboring frames with part of pixels being removed and the mean value row vector of the former frame with part of pixels being removed having a highest match rate.

For example, the central processing unit 1001 may further be configured to: detect flickers of former m frames of the current frame of the video images, m being an integer greater than 1; detect flickers of the video images according to detection result duty ratios of the first frequency and the second frequency in total m+1 frames from the current frame and the former m frames.

For example, the detecting flickers of the video images according to detection result duty ratios of the first frequency and the second frequency in total m+1 frames from the current frame and the former m frames includes: determining that a frequency of the flickers of the video images is the first frequency when the detection result duty ratio of the first frequency in the m+1 frames is greater than a third threshold value; determining that a frequency of the flickers of the video images is the second frequency when the detection result duty ratio of the first frequency in the m+1 frames is less than or equal to the third threshold value and the detection result duty ratio of the second frequency in the m+1 frames is greater than the third threshold value; and determining that there exists no flicker in the video images when the detection result duty ratio of the first frequency in the m+1 frames is less than or equal to the third threshold value and the detection result duty ratio of the second frequency in the m+1 frames is less than or equal to the third threshold value.

In another implementation, the flicker detection apparatus described in Embodiment 1 and the central processing unit 1001 may be configured separately. For example, the flicker detection apparatus may be configured as a chip connected to the central processing unit 1001, with its functions being realized under control of the central processing unit 1001.

In this embodiment, the electronic equipment 1000 does not necessarily include all the parts shown in FIG. 10.

As shown in FIG. 10, the central processing unit 1001 is sometimes referred to as a controller or control, and may include a microprocessor or other processor devices and/or logic devices. The central processing unit 1001 receives input and controls operations of every components of the electronic equipment 1000.

In this embodiment, the memory 1002 may be, for example, one or more of a buffer memory, a flash memory, a hard drive, a mobile medium, a volatile memory, a nonvolatile memory, or other suitable devices. And the central processing unit 1001 may execute the programs stored in the memory 1002, to realize information storage or processing, etc. Functions of other parts are similar to those of the prior art, which shall not be described herein any further. The parts of the electronic equipment 1000 may be realized by specific hardware, firmware, software, or any combination thereof, without departing from the scope of the present disclosure.

It can be seen from the above embodiment that the flickers are detected based on the mean detection values obtained from pairs of neighboring frames in the current frame and the former n frames, which is able to perform flicker detection efficiently, and the detection results are accurate.

Embodiment 3

Figure 11:
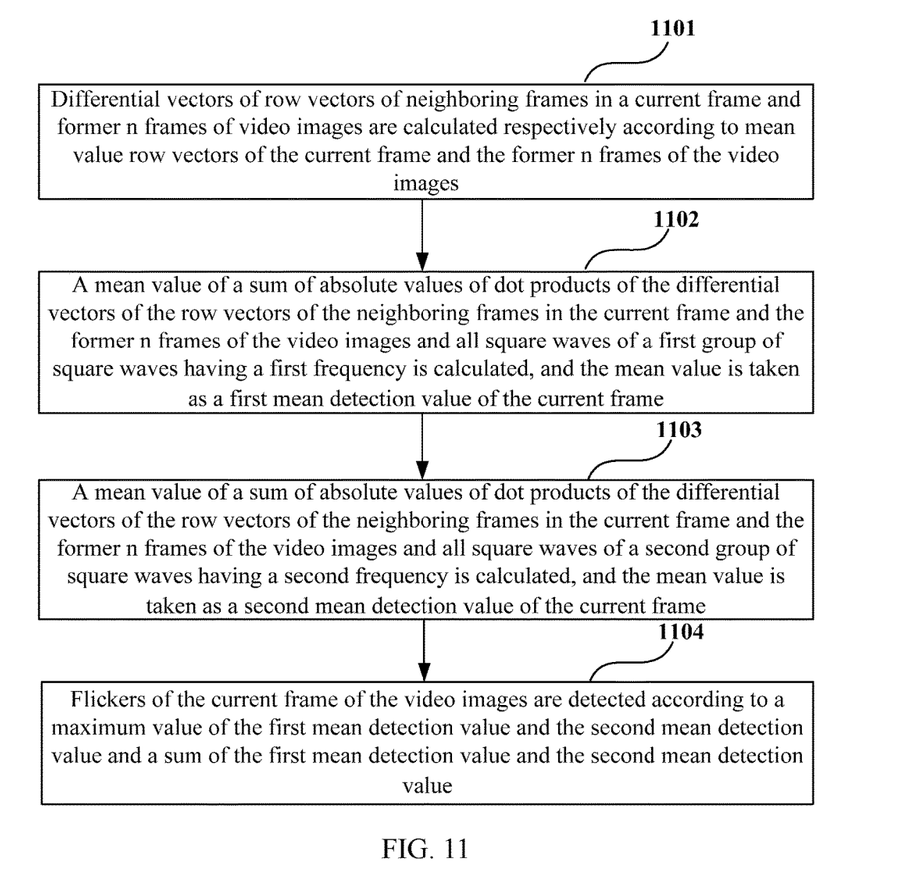
FIG. 11 is a flowchart of the flicker detection method of Embodiment 3 of the present disclosure.

An embodiment of the present disclosure further provides a flicker detection method, corresponding to the flicker detection apparatus described in Embodiment 1. FIG. 11 is a flowchart of the flicker detection method of Embodiment 3 of the present disclosure. As shown in FIG. 11, the method includes:

Step 1101: differential vectors of row vectors of neighboring frames in a current frame and former n frames of video images are calculated respectively according to mean value row vectors of the current frame and the former n frames of the video images, n being an integer greater than or equal to 1;

Step 1102: a mean value of a sum of absolute values of dot products of the differential vectors of the row vectors of the neighboring frames in the current frame and the former n frames of the video images and all square waves of a first group of square waves having a first frequency is calculated, and the mean value is taken as a first mean detection value of the current frame;

Step 1103: a mean value of a sum of absolute values of dot products of the differential vectors of the row vectors of the neighboring frames in the current frame and the former n frames of the video images and all square waves of a second group of square waves having a second frequency is calculated, and the mean value is taken as a second mean detection value of the current frame; and Step 1104: flickers of the current frame of the video images are detected according to a maximum value of the first mean detection value and the second mean detection value and a sum of the first mean detection value and the second mean detection value.

In this embodiment, a method for calculating the differential vectors of row vectors of neighboring frames, a method for calculating the first mean detection value and the second mean detection value and a method for detecting the flickers according to the first mean detection value and the second mean detection value are identical to those described in Embodiment 1, and shall not be described herein any further.

It can be seen from the above embodiment that the flickers are detected based on the mean detection values obtained from pairs of neighboring frames in the current frame and the former n frames, which is able to perform flicker detection efficiently, and the detection results are accurate.

An embodiment of the present disclosure provides a computer-readable program, when the program is executed in a flicker detection apparatus or electronic equipment, the program enables the flicker detection apparatus or the electronic equipment to carry out the flicker detection method as described in Embodiment 3.

An embodiment of the present disclosure further provides a non-transitory computer readable storage medium in which a computer-readable program is stored, the computer-readable program enables a flicker detection apparatus or electronic equipment to carry out the flicker detection method as described in Embodiment 3.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a non-transitory storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. A flicker detection apparatus, comprising:
a memory that stores a plurality of instructions;
a processor coupled to the memory; and the processor is configured to execute the instructions to
calculate respectively differential vectors of row vectors of neighboring frames in a current frame and former n frames of video images according to mean value row vectors of the current frame and the former n frames of the video images, n being an integer greater than or equal to 1;
calculate a first mean value of a sum of absolute values of dot products of the differential vectors of the row vectors of the neighboring frames in the current frame and the former n frames of the video images and all square waves of a first group of square waves having a first frequency, and with the first mean value as a first mean detection value of the current frame;
calculate a second mean value of a sum of absolute values of dot products of the differential vectors of the row vectors of the neighboring frames in the current frame and the former n frames of the video images and all square waves of a second group of square waves having a second frequency, and with the second mean value as a second mean detection value of the current frame; and
detect flickers of the current frame of the video images according to a maximum value of the first mean detection value and the second mean detection value and a sum of the first mean detection value and the second mean detection value.

2. The apparatus according to claim 1, wherein the processor is further configured to:
determine that flickers exist in the current frame of the video images when a predefined condition is satisfied that the maximum value of the first mean detection value and the second mean detection value is greater than a first threshold value and the sum of the first mean detection value and the second mean detection value is greater than a second threshold value; and
determine that no flicker exists in the current frame of the video images when the predefined condition is not satisfied.

3. The apparatus according to claim 2, wherein the processor is further configured to:
determine that a flicker frequency of the flickers in the current frame of the video images is a first frequency when the maximum value of the first mean detection value and the second mean detection value is greater than the first threshold value, the sum of the first mean detection value and the second mean detection value is greater than the second threshold value and the first mean detection value is greater than the second mean detection value; and
determine that the flicker frequency of the flickers in the current frame of the video images is a second frequency when the maximum value of the first mean detection value and the second mean detection value is greater than the first threshold value, the sum of the first mean detection value and the second mean detection value is greater than the second threshold value and the first mean detection value is less than the second mean detection value.

4. The apparatus according to claim 1, wherein n is an integer from 2 to 4.

5. The apparatus according to claim 1, wherein the processor is further configured to:
detect a motion state of the current frame of the video images; and
when the current frame of the video images is in the motion state, remove part of pixels of mean value row vectors of each frame of the current frame and the former n frames of the video images, and recalculate the differential vectors of the row vectors of the neighboring frames in the current frame and the former n frames of the video images for calculating the first mean detection value and the second mean detection value.

6. The apparatus according to claim 5, wherein the processor is further configured to:

remove the part of pixels of the mean value row vectors of each frame of the current frame and the former n frames of the video images;

calculate match rates between the mean value row vector of a latter frame in the neighboring frames with part of pixels being removed and the mean value row vectors of a former frame in the neighboring frames with part of pixels being removed of a same length as the mean value row vectors of a latter frame with part of pixels being removed; and calculate the differential vectors of the row vectors of the neighboring frames in the current frame and the former n frames of the video images according to the mean value row vector of the latter frame in the neighboring frames with part of pixels being removed and the mean value row vector of the former frame with part of pixels being removed having a highest match rate.

7. The apparatus according to claim 1, wherein the processor is further configured to detect flickers of former m frames of the current frame of the video images, m being an integer greater than 1;

and detect flickers of the video images according to detection result duty ratios of the first frequency and the second frequency in total m+1 frames from the current frame and the former m frames.

8. The apparatus according to claim 7, wherein the processor is further configured to:

determine that a flicker frequency of the flickers of the video images is the first frequency when the detection result duty ratio of the first frequency in the m+1 frames is greater than a third threshold value;

determine that the flicker frequency of the flickers of the video images is the second frequency when the detection result duty ratio of the first frequency in the m+1 frames is less than or equal to the third threshold value and the detection result duty ratio of the second frequency in the m+1 frames is greater than the third threshold value; and determine that no flicker exists in the video images when the detection result duty ratio of the first frequency in the m+1 frames is less than or equal to the third threshold value and the detection result duty ratio of the second frequency in the m+1 frames is less than or equal to the third threshold value.

9. A flicker detection method, comprising:

calculating respectively differential vectors of row vectors of neighboring frames in a current frame and former n frames of video images according to mean value row vectors of the current frame and the former n frames of the video images, n being an integer greater than or equal to 1;

calculating a first mean value of a sum of absolute values of dot products of the differential vectors of the row vectors of the neighboring frames in the current frame and the former n frames of the video images and all square waves of a first group of square waves having a first frequency, and with the first mean value as a first mean detection value of the current frame;

calculating a second mean value of a sum of absolute values of dot products of the differential vectors of the row vectors of the neighboring frames in the current frame and the former n frames of the video images and all square waves of a second group of square waves having a second frequency, and with the second mean value as a second mean detection value of the current frame; and detecting flickers of the current frame of the video images according to a maximum value of the first mean detection value and the second mean detection value and a sum of the first mean detection value and the second mean detection value.

10. The method according to claim 9, wherein the detecting flickers of the current frame of the video images according to a maximum value of the first mean detection value and the second mean detection value and a sum of the first mean detection value and the second mean detection value comprises:

determining that flickers exist in the current frame of the video images when a predefined condition is satisfied that the maximum value of the first mean detection value and the second mean detection value is greater than a first threshold value and the sum of the first mean detection value and the second mean detection value is greater than a second threshold value; and determining that no flicker exists in the current frame of the video images when the predefined condition is not satisfied.

11. The method according to claim 10, wherein the determining that there exist flickers in the current frame of the video images when a predefined condition is satisfied that the maximum value of the first mean detection value and the second mean detection value is greater than a first threshold value and the sum of the first mean detection value and the second mean detection value is greater than a second threshold value includes:

determining that a flicker frequency of the flickers in the current frame of the video images is the first frequency when the maximum value of the first mean detection value and the second mean detection value is greater than the first threshold value, the sum of the first mean detection value and the second mean detection value is greater than the second threshold value and the first mean detection value is greater than the second mean detection value; and determining that the flicker frequency of the flickers in the current frame of the video images is the second frequency when the maximum value of the first mean detection value and the second mean detection value is greater than the first threshold value, the sum of the first mean detection value and the second mean detection value is greater than the second threshold value and the first mean detection value is less than the second mean detection value.

12. The method according to claim 9, wherein n is an integer from 2 to 4.

13. The method according to claim 9, wherein the method further includes:

detecting a motion state of the current frame of the video images; and when the current frame of the video images is in the motion state, removing part of pixels of mean value row vectors of each frame of the current frame and the former n frames of the video images, and recalculating the differential vectors of the row vectors of the neighboring frames in the current frame and the former n frames of the video images, for calculating the first mean detection value and the second mean detection value.

14. The method according to claim 13, wherein the when the current frame of the video images is in the motion state, removing part of pixels of mean value row vectors of each frame of the current frame and the former n frames of the video images, and recalculating the differential vectors of the row vectors of the neighboring frames in the current frame and the former n frames of the video images for calculating the first mean detection value and the second mean detection value, includes:

removing the part of pixels of the mean value row vectors of each frame of the current frame and the former n frames of the video images;

calculating match rates between the mean value row vector of a latter frame in the neighboring frames with part of pixels being removed and the mean value row vectors of a former frame in the neighboring frames with part of pixels being removed of a same length as the mean value row vector of a latter frame with part of pixels being removed; and calculating the differential vectors of the row vectors of the neighboring frames in the current frame and the former n frames of the video images according to the mean value row vector of the latter frame in the neighboring frames with part of pixels being removed and the mean value row vector of the former frame with part of pixels being removed having a highest match rate.

15. The method according to claim 9, wherein the method further includes:

detecting flickers of former m frames of the current frame of the video images, m being an integer greater than 1;

detecting flickers of the video images according to detection result duty ratios of the first frequency and the second frequency in total m+1 frames from the current frame and the former m frames.

16. The method according to claim 15, wherein the detecting flickers of the video images according to the detection result duty ratios of the first frequency and the second frequency in total m+1 frames from the current frame and the former m frames includes:

determining that a flicker frequency of the flickers of the video images is the first frequency when the detection result duty ratio of the first frequency in the m+1 frames is greater than a third threshold value;

determining that the flicker frequency of the flickers of the video images is the second frequency when the detection result duty ratio of the first frequency in the m+1 frames is less than or equal to the third threshold value and the detection result duty ratio of the second frequency in the m+1 frames is greater than the third threshold value; and determining that no flicker exists in the video images when the detection result duty ratio of the first frequency in the m+1 frames is less than or equal to the third threshold value and the detection result duty ratio of the second frequency in the m+1 frames is less than or equal to the third threshold value.

17. A flicker detection apparatus, comprising:
a memory; and
a computer, the computer is configured to:
calculate respectively differential vectors of row vectors of neighboring frames in a current frame and former n frames of video images according to mean value row vectors of the current frame and the former n frames of the video images, n being an integer greater than or equal to 1;

calculate a first mean value of a sum of absolute values of dot products of the differential vectors of the row vectors of the neighboring frames in the current frame and the former n frames of the video images and all square waves of a first group of square waves having a first frequency, and with the first mean value as a first mean detection value of the current frame;

calculate a second mean value of a sum of absolute values of dot products of the differential vectors of the row vectors of the neighboring frames in the current frame and the former n frames of the video images and all square waves of a second group of square waves having a second frequency, and with the second mean value as a second mean detection value of the current frame; and detect flickers of the current frame of the video images according to a maximum value of the first mean detection value and the second mean detection value and a sum of the first mean detection value and the second mean detection.

18. A non-transitory computer readable storage storing a flicker detection method for controlling a computer, the method comprising:

calculating respectively differential vectors of row vectors of neighboring frames in a current frame and former n frames of video images according to mean value row vectors of the current frame and the former n frames of the video images, n being an integer greater than or equal to 1;

calculating a first mean value of a sum of absolute values of dot products of the differential vectors of the row vectors of the neighboring frames in the current frame and the former n frames of the video images and all square waves of a first group of square waves having a first frequency, and with the first mean value as a first mean detection value of the current frame;

calculating a second mean value of a sum of absolute values of dot products of the differential vectors of the row vectors of the neighboring frames in the current frame and the former n frames of the video images and all square waves of a second group of square waves having a second frequency, and with the second mean value as a second mean detection value of the current frame; and detecting flickers of the current frame of the video images according to a maximum value of the first mean detection value and the second mean detection value and a sum of the first mean detection value and the second mean detection value.

* * * * *